United States Patent [19]
Kosmowski

[11] 4,088,417
[45] May 9, 1978

[54] METHOD AND APPARATUS FOR HIGH SPEED, HIGH PRECISION DRILLING AND MACHINING

[75] Inventor: Wojciech Kosmowski, Fountain Valley, Calif.

[73] Assignee: Advanced Controls Corp., Santa Ana, Calif.

[21] Appl. No.: 774,479

[22] Filed: Mar. 4, 1977

[51] Int. Cl.² .................. B23B 35/00; B23B 39/16; B23B 47/18

[52] U.S. Cl. .................. 408/1 BD; 408/43; 408/46; 408/52; 408/137; 408/240; 408/234

[58] Field of Search .................. 408/1, 137, 129, 230, 408/42, 43, 52, 46, 240, 234

[56] References Cited
U.S. PATENT DOCUMENTS
| | | | |
|---|---|---|---|
| 2,796,767 | 6/1957 | Carpenter | 408/137 X |
| 3,246,544 | 4/1966 | Cooper | 408/52 X |

*Primary Examiner*—Gil Weidenfeld

[57] ABSTRACT

A drill may be fed into a workpiece at a rate where the angle descent is less than the primary relief angle of the drill and wherein the extruding action takes place in ⅛ or less of the drill diameter. Unachieved rates of drill feed speed with high precision may be achieved without punching or crushing the material of the workpiece. In order to accomplish such drilling rates an improved feed mechanism, utilizing a positively driven lead screw is employed. In addition, in order to utilize the high drilling rate, a multiple bank of spindles is devised having an X-Y adjustable configuration used in combination with a worktable translated by a lead screw and nut combination. The lead screw of the worktable is disposed within the worktable in the proximity of the axis of symmetry to the worktable in order to minimize twisting moments to the worktable. An automated collet is utilized in each of the spindles together with tool holders to provide for automatic changing of the drill bits without operator intervention.

23 Claims, 11 Drawing Figures

METHOD AND APPARATUS FOR HIGH SPEED, HIGH PRECISION DRILLING AND MACHINING

BACKGROUND OF THE INVENTION

1. Field of the Invention

The present invention relates to the field of drilling and machining apparatus and methods, and in particular relates to the method and apparatus for numerically controlled drilling of printed circuit boards.

2. Description of the Prior Art

High speed, precision drilling has long been practiced in regard to the fabrication of printed circuit boards. Often the drilling of the required holes in the printed circuit board is the most time consuming and costly step in the fabrication process and limits the maximum output capacity of most fabricators. Industry standards have been assumed for the fabrication of printed circuit boards. Such long held industry wide beliefs have assumed that feed rates of drills are limited by the following standard.

Firstly, the practical chip load limit is 0.002 per inch revolution. Secondly, a per revolution feed rate which exceeds the thickness of the printed circuit board's copper layers will result in punching rather than a clean cutting action thereby destroying precision and jeopardizing the electrical integrity of the conductive overlays on the nonconductive board. Thirdly, higher feed rates will inevitablly create excessive burring at the top surface of the holes and will roughen hole walls. Fourthly, high speed drilling using high spindle speeds generates large amounts of heat in the printed circuit board thus causing epoxy smear. The underlying epoxy resin of which the nonconductive portion of the board is constituted, melts and is smeared across the copper layers typically disposed on the upper surface of the board. Such epoxy smear is likely to cause later plating defects.

What is needed then is a method for high speed, high precision drilling and an apparatus for performing the same which is not limited by the maximum performance parameters assumed by the industry, which does not produce epoxy smear, and which produces cleanly cut, high precision holes in printed circuit boards at a high repetition rate.

BRIEF SUMMARY OF THE INVENTION

The present invention is a method for high speed precision drilling which includes the step of feeding a drill into the workpiece at a rate wherein the angle of descent is less than the primary relief angle of the drill by a preselected increment. The chisel point area of the drill extends from the center of the drill by a distance equal to or less than $\frac{1}{8}$ the radius of the drill. The noncutting portion of drill, which is extruding instead cutting, does not exceed $\frac{1}{8}$ of diameter of drill. As a result of utilizing such a drill at the above feed rate, a large number of workpieces may be drilled with a large number of holes in a small interval of time with a high degree of precision and without the need of operator skill.

The present invention also includes an apparatus for use in high speed precision drilling and machining comprised of a movable worktable for holding and positioning a plurality of workpieces, a movable spindle gantry disposed in a spaced apart relationship with respect to the worktable, a plurality of spindles disposed on the spindle gantry is a functionally operable relationship with respect to the workpieces, and means coupled to each of the spindles for driving the spindles perpendicularly with respect to a corresponding one of the workpieces. The means includes a member having a plurality of engaging surfaces to execute bidirectional motion perpendicular to the workpieces at a feed rate wherein the angle of descent of the tool is less than primary relief angle of the tool by a preselected increment. By virtue of this combination of elements the spindles may be directly driven at high rates of feed with a high degree of precision and stability.

The apparatus of the present invention may also include an overlay plate disposed between the spindle and each of the workpieces. The spindle may also include means for automatically engaging and disengaging a tool. The means may be comprised of a collet, a sleeve and a means for moving the sleeve. The collet has a plurality of jaw members selectively assuming an open and closed configuration. The jaw members are biased to assume an open configuration and are used for engaging the tool. The sleeve is disposed about the collet for selectively urging the jaw members into a closed configuration. The means for moving the sleeve with respect to the collet selectively opens and closes the jaw members.

The movable worktable of the present invention may be translated along a given axis by a lead screw, engaging nut, and motor means for imparting a bidirectional force to the lead screw. The given axis is disposed in the proximity of the axis of symmetry of the worktable so that torques applied to the worktable are substantially minimized.

The apparatus of the present invention may also include a plurality of the spindles which are disposed in at least two rows. Each row is selectively spaced from the other by a means for adjusting the distance between each of the rows.

The apparatus of the present invention may further include a plurality of tools disposed in a tool changer coupled to the worktable. The tool changer may include a means for selectively disposing the plurality of tools in a first position for access by at least one of the spindles. The means may also selectively dispose a plurality of tools in a second position to permit unobstructed movement of at least one of the spindles to return to the position of the workpiece after engaging one of the tools.

These and other embodiments of the present invention are illustrated and may be understood in connection with the following detailed description of preferred embodiments in light of the attached drawings.

DETAILED DESCRIPTION OF THE PREFERRED EMBODIMENTS

The present invention includes a method for high speed precision drilling including the step of feeding a drill into a workpiece by means of a spindle which is fed towards the workpiece by a lead screw and engaging nut coupled to the spindle. The lead screw is advanced and retracted through the engaging nut at a rate such that the angle of descent of the drill is less than the primary relief angle of the drill by a predetermined increment. By practice of this step a large number of workpieces may be drilled with a large number of holes in a small interval of time with a high degree of precision and without the need for a high degree of operator skill.

The present invention further includes an apparatus for high speed precision drilling which comprises a movable worktable for holding and positioning a plurality of workpieces. Each workpiece has an overlay plate disposed on the upper surface of the workpiece. The worktable is translated along a given axis by a first lead screw, first engaging nut and first motor means. The first motor means imparts a bidirectional force to the lead screw. The given axis is disposed in the proximity of the axis of symmetry of the worktable so that torques applied to the worktable are minimized. A movable spindle gantry is disposed in a spaced apart relationship with respect to the worktable. A plurality of spindles are disposed on the spindle gantry in at least two rows. Each row is selectively spaced by a first means for adjusting the distance between each of the rows. Each spindle has a second means for automatically engaging and disengaging a tool. The second means includes a collet, sleeve and third means. The collet has a plurality of resistant jaw members biased in an open and spaced apart relationship to release the tool. The sleeve has an internal truncated conical surface in slinding contact with the jaw members. The sleeve is movable with respect to the jaw members and urges the jaw members into a closed relationship to grasp the tool. The third means is for moving the sleeve member with respect to the jaw members. A fourth means is coupled to each of the spindles for driving each spindle perpendicularly with respect to the worktable. The fourth means includes a driven lead screw. Finally, the apparatus includes a tool changer for holding a plurality of tools and for disposing the tools in the first position to permit engagement of one of the tools by the collet and in a second position to permit unobstructed movement of the spindles. A method and apparatus of the present invention together with its other embodiments may be better understood by referring to each of the figures in detail.

Figures 1, 2, 4:
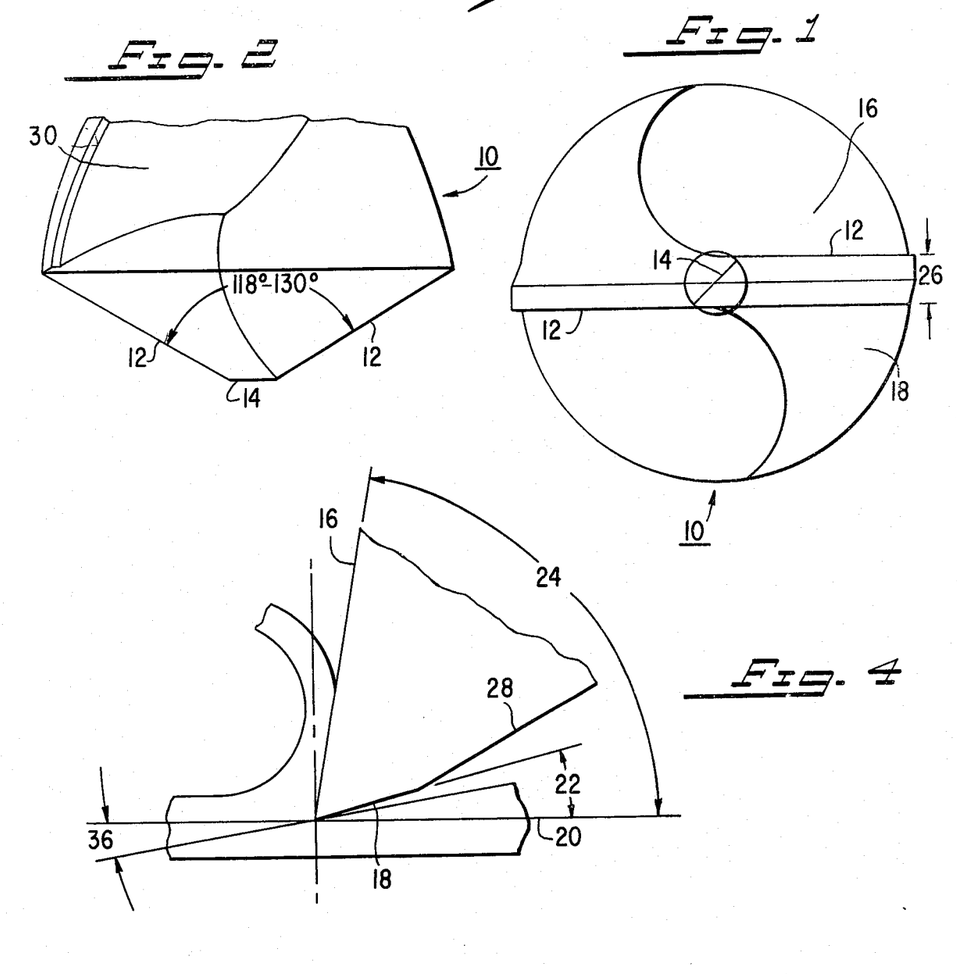
FIG. 1 is an end view of the cutting edge of a twist drill bit used in the method and apparatus of the present invention.
FIG. 2 is a side view of the end portion of the twist drill bit shown in FIG. 1.
FIG. 4 is a diagramatic cross sectional view of the drill bit of FIGS. 1 and 2 shown cutting into the material of a workpiece.

FIG. 1 illustrates the end view of a twist drill bit 10 which may be used in the present invention. Although many other types of drill bits may be used, the drill configuration as illustrated in FIG. 1 provides a typical example of a practical printed circuit board twist drill. Drill 10 has two cutting edges 12 disposed on its end surfaces on opposite sides of the drill point. Cutting edges 12 meet in the center region of drill 10 in a chisel point 14. Typically, the cutting edges 12 as shown in FIG. 2, are disposed with respect to each other at an angle in the range of 118 degrees to 165 degrees and meet in the center of the drill tip along chisel point 14. Cutting edges 12 are formed by the intersection of a surface 16 and a primary relief surface 18. Cutting is designed to take place along cutting edge 12 formed between the primary relief angle and the rake angle. As shown in FIG. 4, the primary relief angle 22 is the angle which primary relief surface 18 makes with respect to the horizontal plane 20, which is defined as the plane perpendicular to the axis of symmetry of drill 10. Rake angle 24 is the angle which surface 16 makes with respect to horizontal plane 20. Typically, the cutting edges are offset from each other by a web thickness shown in FIG. 1. As shown in FIG. 4, the primary relief surface 18 may be broken and give way to a secondary relief surface 28. Typically, primary relief angle 22 is in the range of 12 to 15 degrees while rake angle 24 varies with the drill size and manufacturer. Primary relief surface 18 extends from the center of drill 10 to its outside diameter thereby creating the two relief planes which intersect to establish chisel point 14. As shown in FIG. 2, each cutting edge 12 is associated with a flute 30 in which the chip is directed upward and away from the cutting edge as it is removed from the material of the workpiece.

Figure 3:
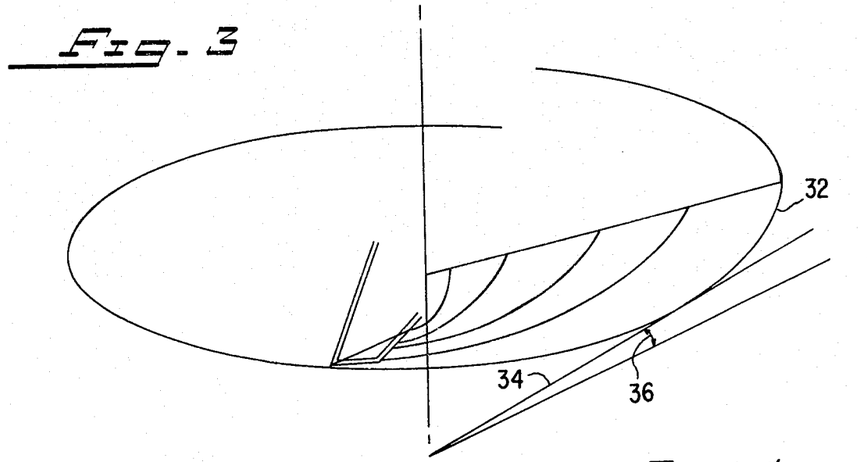
FIG. 3 is a diagramatic illustration of the movement of the cutting edge of the drill bit shown in FIGS. 1 and 2 through a workpiece.

FIG. 3 diagramatically illustrates the movement and cutting action of drill 10. As drill 10 is rotated and driven downwardly into the workpiece, chisel edge 14 pushes or extrudes the material in its path. The center of drill 10 acts as a rotatry ram driving the material of the workpiece forward and outward into the path of cutting edges 12. Cutting edges 12 sweep the cutting area in a circular motion and are simultaneously driven into the workpiece by the linear fed of drill 10. As a result each point on cutting edge 12 traces a spiral path 32. The velocity of a point on cutting edge 12 as it moves through the material of the workpiece increases as one moves from the center of drill 10 to the extremity of its diameter. During a given segment of rotation, each point on cutting edge 12 will be fed vertically into the work piece the same distance but will travel different linear distances depending on the distance of the point from the center drill 10. Thus, each point on cutting edge 12 will descend at a different slope and will move through the material of the workpiece at a different linear velocity. At and near the center of drill 10 the cutting edges are characterized by a small linear velocity and a steep slope. Consequently, the material of the workpiece is crushed and pushed aside rather than cut. Typically, the area which is subject to the crushing action is determined by web thickness 26.

According to the present invention, since the pushing and crushing action near the center of drill 10 cannot be avoided, it has been discovered that unexpected and exceedingly high drilling rates may be achieved compared to those normally assumed throughout the industry by restricting this central area so that the extremity of the area extends no further from the drill's center than ⅛ the drill radius. The maximum chip load, as a function of feed distance per revolution can be calculated by noting that a point on the edge of this center region will travel a linear distance of ⅛ D per revolution, where D is the diameter of the drill. The angle which the tangent 34 to spiral 32 makes to horizontal plane 20, as shown in FIG. 3, is known as the angle of descent. The tangent of this angle is X (⅛ D). Although the angle of descent for each point on the cutting edge is different, the feed rate is identical for all points. Therefore, it will be assumed throughout this specification, that wherever the angle of descent is mentioned such angle is to be taken from a point on the cutting edge at a distance of ⅛ the radius from the center of drill 10.

According to the present invention, angle of descent 36 shown in FIG. 4 must be chosen to be less than primary relief angle 22 by a preselected increment. Theoretically, angle of descent 36 according to the present invention may be set substantially equal to primary relief angle 22. If angle of descent 36 exceeds primary relief angle 22, drill 10 will be fed into the material of workpiece at such a rate that primary relief surface 18 is forced against the slope of material just cut by cutting edge 12. Such phenomenon is known as heel dragging. Heel dragging is characterized by the generation of excessive heat which may polish the surface of the material to be cut making it more difficult to cut. This may burn or ignite the workpiece, or may burn drill 10, heating drill 10 to such an extent that the temper and hardness of the cutting edge is lost. If the workpiece is composed of epoxy resin part of the workpiece could be liquified by generation of the heat created by heel dragging. Later as it solidifies and cools while traveling up flutes 30, it could bind drill 10 to the workpiece and thus either fracture the workpiece, stall the drill or cause drill 10 to shear. In order to avoid heel dragging in a practical situation, angle of descent 36 must be less than primary relief angle 22 by a preselected increment which is determined according to cutting speeds, material cut, overall geometry and design of the drill. For example, in the case where drill 10 has a primary relief angle 22 equal to 15°, it has been found practical, and to afford a reasonable degree of safety to limit angle of descent 36 to 13° to 10°.

Thus, according to the present invention the maximum practical feed rate, conservatively assuming an angle of descent 36 of 10° is given by multiplying the tangent of 10° by ⅛ D. For example, a number 80 drill having a 0.0135 inch diameter may be used at a feed rate according to the present invention, of approximately 0.0023 inch per revolution or, for a number 55 drill having a 0.052 diameter at a feed rate of 0.0094 inch per revolution. It has been observed that at such feed rates no punching or other undesirable drilling effects feared by high speed drilling by the prior art is observed. In fact, holes produced by drilling according to the present invention are precise, clean cut and do not evidence epoxy smear.

Practice of the method of the present invention has been found to be limited available spindle RPM, spindle torque, smooth feed rate drive, volume of the flute relief of the drill, torsional strength of the drill, torsional load on the drill as a function of depth of drilling, and the composition of the material of the workpiece. For example, assuming that the maximum linear velocity at which a cutting edge may be driven through the material of the workpiece is approximately 750 feet per minute, at the feed rates of the present invention, spindle speeds of 220,000 RPM would be required for a drill size number 80, while a size 13 drill would require a spindle speed of 15,400 RPM. In practice, spindle speeds range between 20,000 and 80,000. In the prior art 0.002 inch per revolution was regarded as a feed rate beyond which the drill would bind and the spindle would stall due to the excessive torque applied to the drill bit. According to the method of the present invention feed rates for even drills of size No. 80 exceed 0.0020 inches per revolution and increase to 0.0333 inches per revolution for a 3/16 drill. Therefore, prior art spindles generally develop inadequate amounts of torque. In addition, prior art printed circuit board drilling machines were incapable of delivering a smooth feed drive above a feed rate of 200 inches per minute. However, according to the method of the present invention, a 3/16 inch drill would require a feedrate of approximately 500 inches per minute. Furthermore, at high feedrates when drilling very deep holes, the torsional load of the chips being carried upward along drill flutes 30 become very large. It has been determined as a practical matter that with presently given materials used for standard printed circuit drill bits, the maximum feedrates which are achievable according to the present invention cannot be maintained when hole depth is approximately 5 to 7 times the drill diameter. In many production runs when multiple layers of board are drilled, the depths of the hole may be as great as 13 times larger than the drill diameter. In such cases, the feedrate must be reduced to an empirically safe level. However, if at some future time an improved flute design for twist drills or an improved composition increases the torsional limits of such drills, the feedrates of the present invention may be realized and practiced.

Finally, the practice of the present invention may have to be modified according to the composition of the workpiece. When the workpiece is fabricated from a coarse glass cloth the amount of shock delivered to drill is increased and there is a greater tendency for the drill to be deflected into the softer resin areas between the coarse fibers. Such bending and loading on the drill not only tends to reduce precision but creates stresses and strains which may ultimately fatigue the drill bit. In addition, improperly cured resin may turn into a tar or gum during drilling thereby coating the drill and degrading hole quality and precision. Thus, feed rates must be modified according to the coarseness of glass cloths used in the printed circuit board and the perfection of curing obtainable in the impregnated resin.

Figure 5:
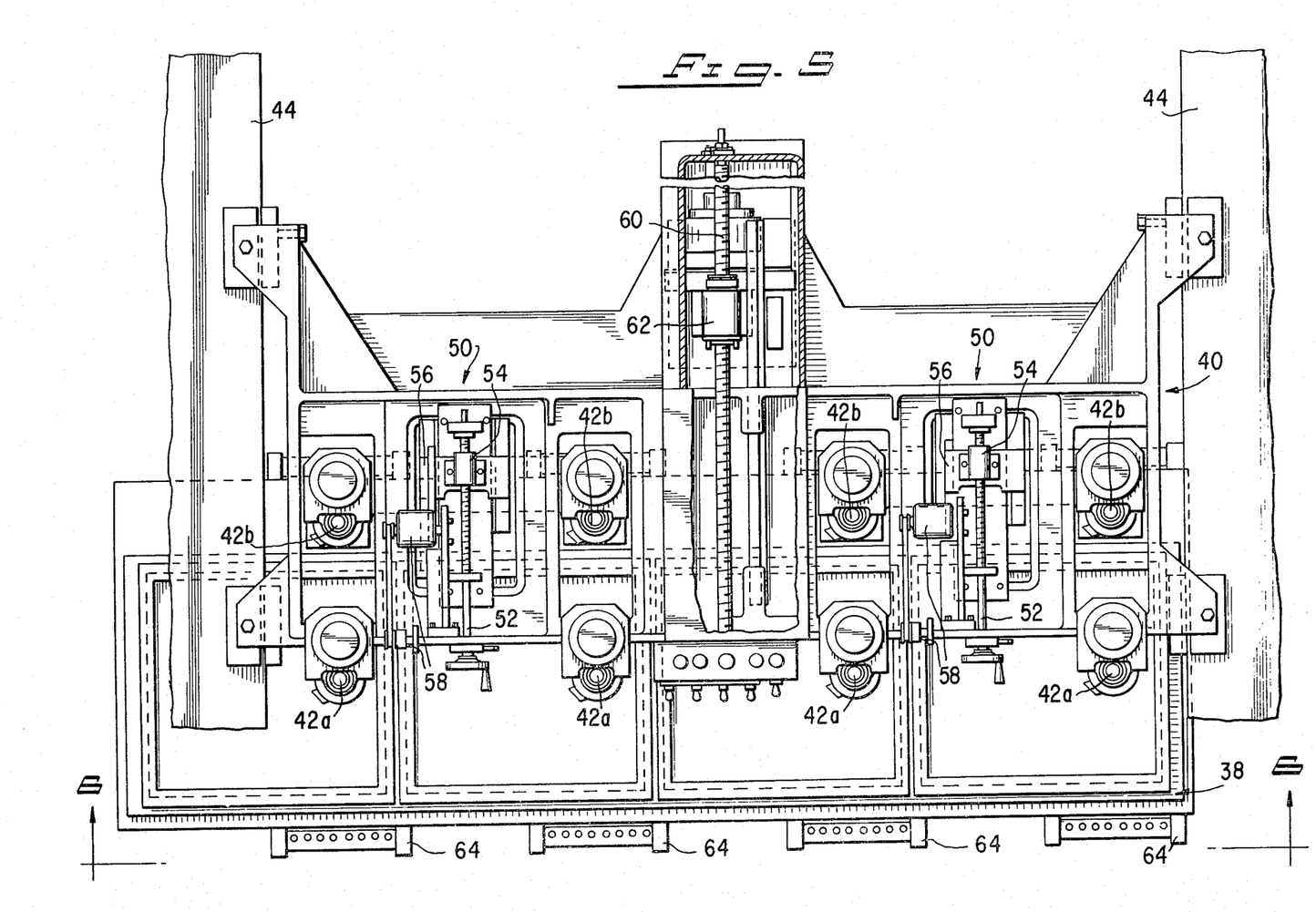
FIG. 5 is a plan view of an embodiment of the apparatus of the present invention wherein eight spindles are employed.

Clearly, prior art apparatus is incapable of performing the method of operation of the present invention without crippling and substantial limitations. It thus became necessary to devise an apparatus which could perform within heretofore unobtained parameters. FIG. 5 illustrates a plan view of the apparatus of the present invention which is comprised of a movable worktable 38 disposed below a movable spindle gantry 40 on which a plurality of spindles 42 have been deployed. As partly shown in FIG. 6, gantry 40 is spaced from a heavy and rigid frame 44 by means of a plurality of air bearings 46. Similarly, worktable 38 rides on frame 44 by a similar plurality of sliding spacers 48.

As shown by way of example in FIG. 5 eight spindles 42 are arranged in two rows in a regularly spaced pattern. The row of spindles 42a are rigidly coupled to gantry 40 and form the first row. Spindles 42b are coupled in a pairwise fashion to a means 50 for adjusting the distance between the first and second row. Means 50 may include a manually driven lead screw 52 which engages a driven nut 54. Driven nut 54 in turn is rigidly coupled to a sliding plate 56 disposed within gantry 40 by a means well known to the art and coupled to two of the spindles 42b. Thus each pair of spindles 42b is associated with a single lead screw 52 and may be advanced or retracted with respect to spindles 42a according to the rotation of lead screw 52. The amount of movement of spindles 42b is indicated by a conventional counter assembly 58 well known to the art which is actuated in response to the relative motion of sliding plate 46 to spindles 42a.

Gantry 40 may be translated as a whole in what may be termed as the X direction by a means which may include a lead screw 60 and an engaging nut 62. It must be understood that either lead screw 60 or engaging nut 62 may be the driving member and may be driven by conventional means including a combination of pulley, belt and electric or pneumatic motor.

Figure 6:
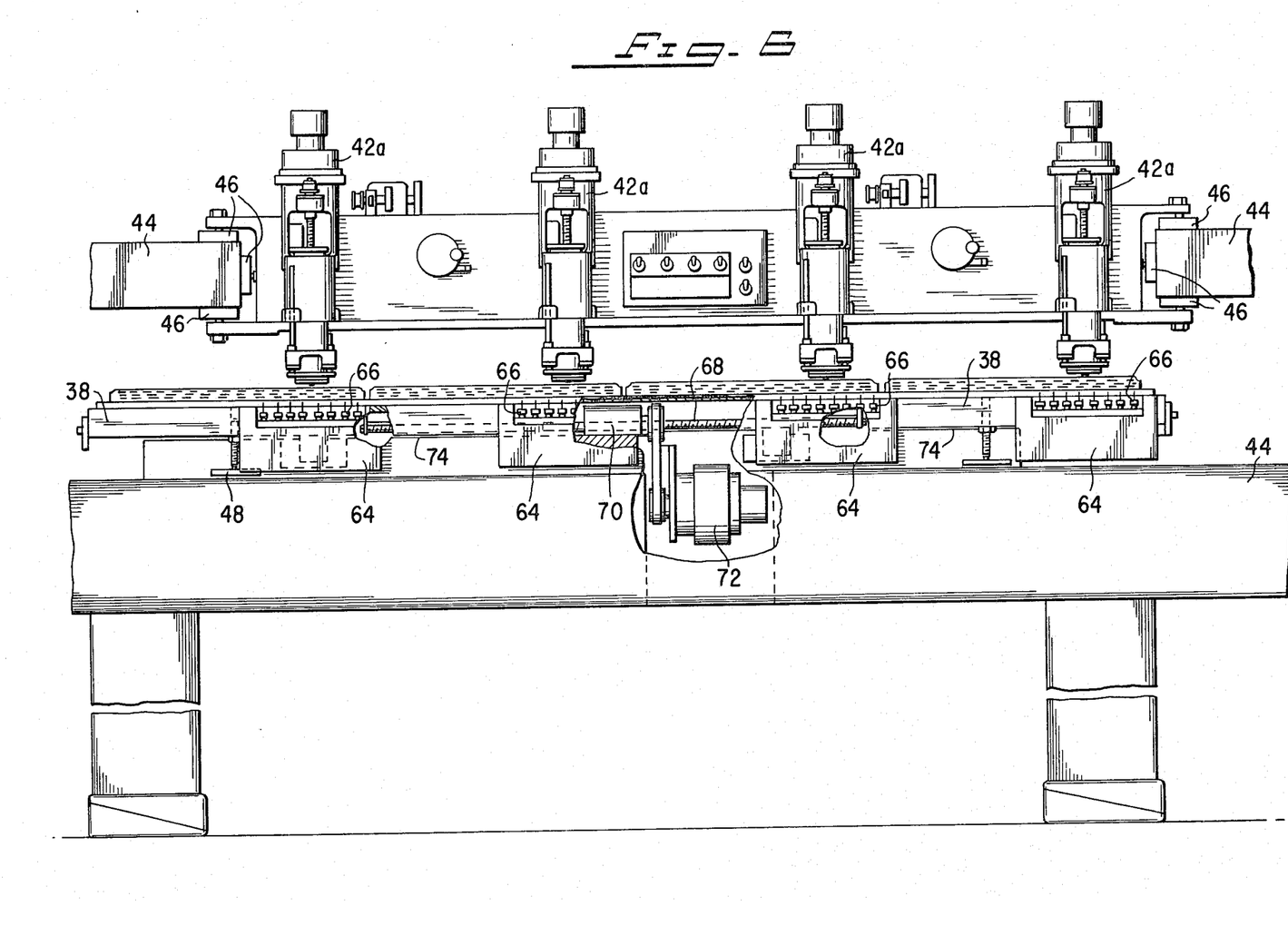
FIG. 6 is a side view of the apparatus of FIG. 5.

The apparatus of the present invention had to be designed to solve many unique problems not encountered by the prior art. Due to the high drilling rate, wherein production capacity could easily reach 400 hits per minute, some means became necessary to provide an extremely stable spindle feed mechanism, to provide high table accelerations without lost of precision due to acceleration torques, and to provide a means for quickly and automatically changing tools. Without the incorporation of such features it was found that production rates would be limited and a substantial fraction of production time would be spent changing tools, and moving the workpieces between work stations. FIGS. 5 and 6 show an automated tool changer 64 coupled to worktable 38. A single tool changer 64 is provided for each spindle 42a or 42b. Each tool changer 64 includes a plurality of tools or drills 66. It must be expressly understood throughout the specification that even though the present illustration has been cast primarly in the form of drilling, any machining process known to the art might also be adapted for use in the present apparatus such as routing or milling.

FIG. 6 shows worktable 38 being driven by a lead screw 68 which may be coupled to table 38 by one or more engaging nuts 70. In the illustrated embodiment lead screw 68 is shown as being driven by a belt and pulley combination together with motor 72. It is of course to be understood that any equivalent means of driving table 38 might be employed such as maintaining lead screw 68 in a stationary relationship with respect to table 38 while driving an engaging nut rigidly fixed with respect to frame 44. It is to be particularly noted that the lower surface 74 of table 38 lies below lead screw 68. In other words, lead screw 68 has been disposed within a recession formed within table 38 such that lead screw 68 lies in the proximity of the axis of symmetry of table 38. The lever arm between lead screws 68 and the axis of symmetry of table 38 has been decreased as compared to prior art tables. When lead screw 68 is subjected to a sudden acceleration, as when worktable 38 is moved from one work position to adjacent work position in a short period of time, the frictional contact between lead screw 68 and engaging nut 70 is such that a torque will be applied to table 38 during period of high acceleration of lead screw 68. Such phenomenon is similar to engine dip in automotive engines and is accentuated the further lead screw 68 is disposed from the axis of symmetry of table 38. Thus, by reason of the present invention, the degree of deflection of depth which table 38 will experience durng sudden accelerations can be minimized.

Figure 7:
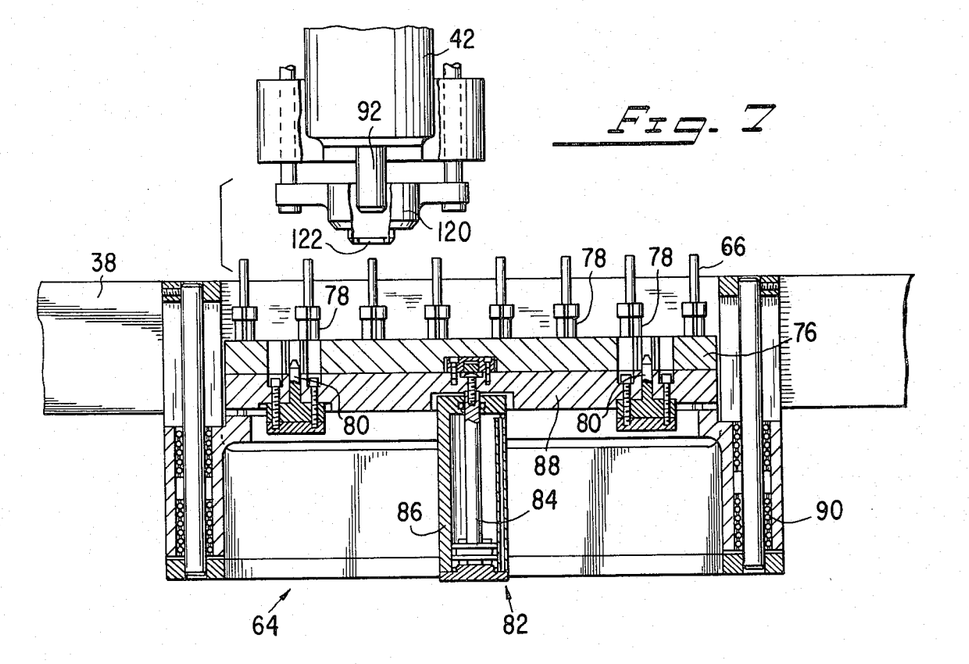
FIG. 7 is a diagramatic cross section of one of the tool changers shown in a position to allow unobstructed movement of the overlying spindle.
Figure 8:
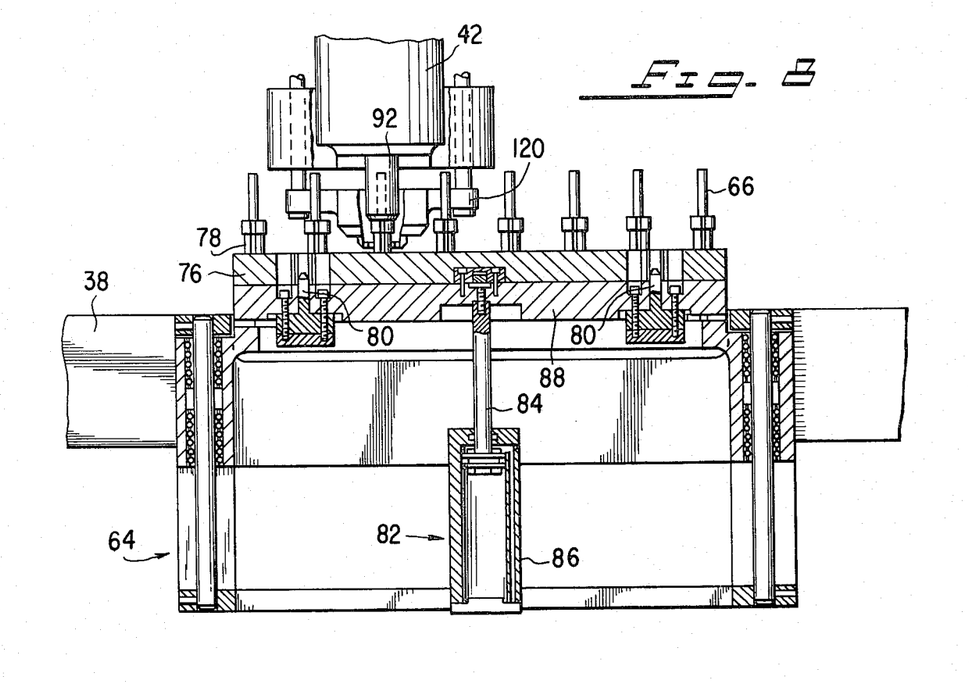
FIG. 8 is the view of FIG. 7 after the tool changer has been disposed into a position permitting the spindle to engage one of the tools.

The operation of tool changer 64 in regard to spindle 42 is better illustrated in FIGS. 7 and 8. Tool changer 64 may include a tool holder magazine 76 on which a plurality of tool holders 78 have been disposed. Tools 66 are inserted into tool holders 78. Tool holders 78 may be used in a numerically controlled apparatus, such that spindle 42 moves from the unengaged position as shown in FIG. 7 to the engaged position as shown in FIG. 8 according to automated control. Thus, tool holder magazine 76 must be accurately positioned at a predetermined station. Such registration is easily achieved by registration pins 80.

Tool holder 78 is capable of assuming a first position in which magazine 76 and tools 66 are disposed at least in part below the upper surface of table 38, as shown in FIG. 7. Tool changer 64 may also assume a second position whereby tools 66 and magazine 76 are disposed in an elevated position thereby inserting the appropriate tool into the desired spindle 42 which has been disposed over tool magazine 76. The cross sectional view of tool changer 64 shows in FIGS. 7 and 8 an actuating piston 82 which may be pneumatically or hydraulically operated to extend a piston rod 84 from cylinder 86. Piston rod 84 is rigidly coupled to body 88 which supports tool magazine 76 and which is slightly attached by an appropriate bearing surface 90 to flanges coupled to table 38. Thus, when a tool change is desired spindle 42 moves over the edge of table 38 as shown in FIG. 5 by a movement of gantry 40 in the X direction. Table 38 is translated by means of lead screw 68 in what may be defined by the "Y" direction, and appropriatively positions one of tools 66 beneath the spindle 42 as shown in FIG. 7. Actuating piston 82 is then activated and tool 66 rises and is inserted into the open collet 92 of the spindle 42.

Figures 9, 10, 11:
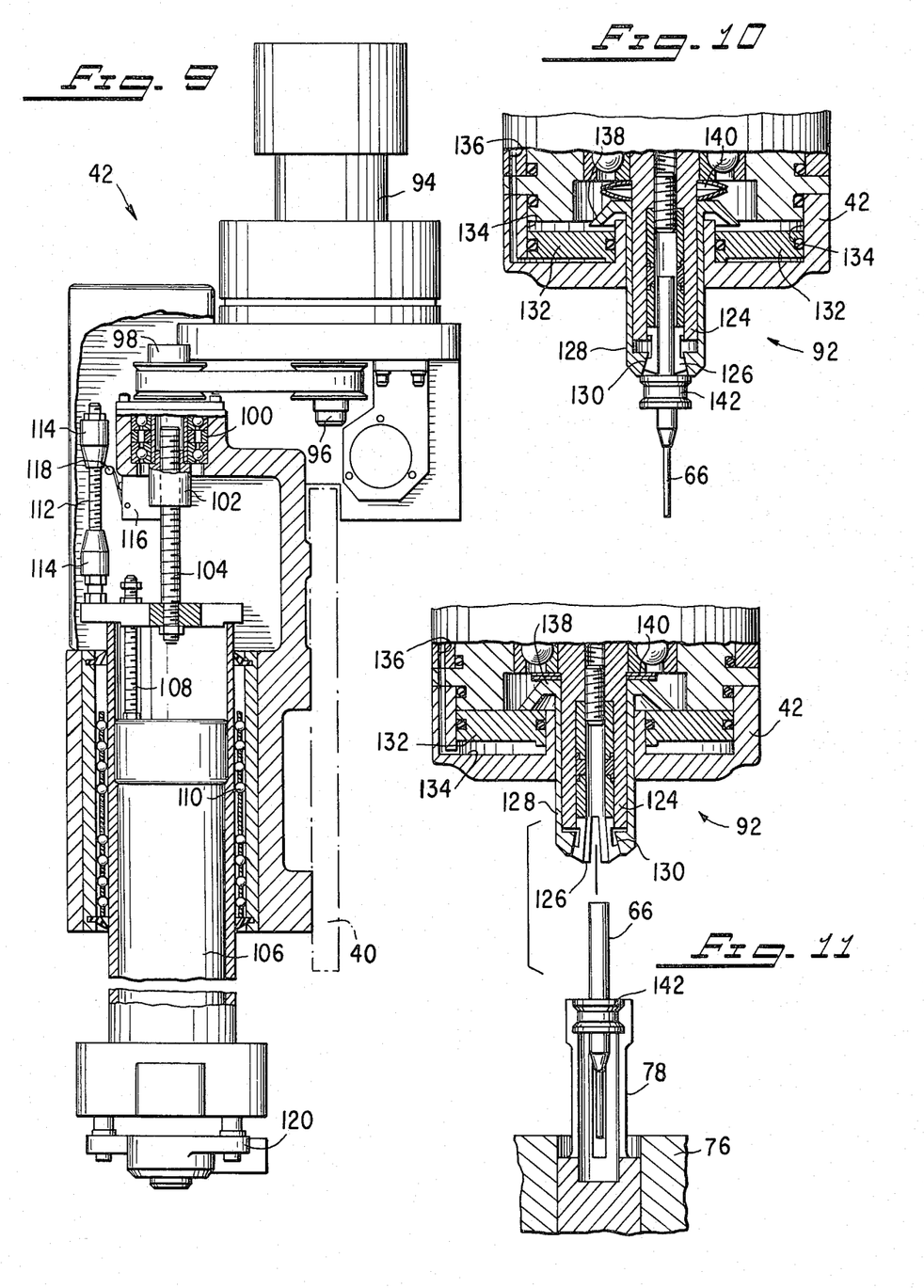
FIG. 9 is a partially cut away side view of one of the spindles of the present invention showing the spindle drive.
FIG. 10 is a detailed view of the collet included within the spindle shown as engaging a tool.
FIG. 11 is the view of FIG. 10 wherein the collet of the present invention is in the open configuration to permit disengagement of the tool.

The operation of the spindle and the collet is better shown in FIGS. 9 – 11. In FIG. 9, the upper portion of spindle 42 is shown in a cutaway view. The feed of spindle 42 is driven by a motor 94. Motor 94 is coupled to a drive axis 96 which in turn is coupled by a pulley and belt combination to a driven axis 98. In the embodiment illustrated in FIG. 9, driven axis 98 is extended through a bearing surface 100 to an engaging nut 102. Nut 102 engages a lead screw 104 which in turn is rigidly coupled to a spindle motor 106. Lead screw 104 is stationary with respect to spindle 42 and is advanced and retracted according to the rotation of engaging nut 102. In the embodiment illustrated, the spartial relationship between spindle motor 106 and collet 92 with respect to lead screw 104 may be manually adjusted by an adjustment of screw 108. Spindle motor 106 is disposed within spindle 42 within a bearing surface 110. A limit stop 112 may be manually adjusted and employed to provide a safety cut off for the feed of spindle 42 by means of adjustable nuts 14 threaded on the ends of limit stops 112 and microswitch 116. Microswitch 116 is electrically coupled to the control circuit for feed motor 94. Thus at either extreme nut 114 will engage roller 118 of microswitch 116 and limit the extreme movement of spindle 42.

A pressure foot 120 is provided at the lower extremity of spindle 42 as shown in FIG. 9. As shown in cross section FIGS. 7 and 8 pressure foot 120 is provided with an aperture 122 having an inner diameter greater than the greatest dimension of tool holder 78 or tool 66. Pressure foot 120 serves to provide a resilient contact pressure between spindle 42 and the workpiece when spindle 42 is lowered to an operative position. FIGS. 10 and 11 show in greater detail one embodiment of tool 66, means 92 and the way in which means 92 may cooperate with tool changer 64 for automatic tool changing. Means 92 may include a collet 124 which has a plurality of resilient jaw members 126 for engaging and disengaging tools 66. A sleeve 128 is disposed about collet 124 to urge jaw members 126 into a closed configuration to engage tool 66. Collet 24 is coupled to spindle motor 106 and thus the rotational force from spindle motor 106 is directly transmitted to an engaged tool 66 as shown in FIG. 10. Sleeve 128 is disposed upwardly and therefore permits the outwardly biased, resilient jaw members 126 to expand permitting tool 66 to be released from collet 124 and placed within tool holder 78. As shown in FIG. 11 tool holder 78 is then lowered by operation of tool changer 64 as previously described in connection with FIGS. 7 and 8. Sleeve 128 is provided with an internal truncated conical surface 130 which in the illustrated embodiment is arranged to have a smaller internal diameter at its upper portion than at the lower portion. Thus, as sleeve 128 is moved upwardly with respect to collet 124, the point of contact between jaw members 126 and sleeve 128 moves downward along surface 130. As the internal diameter of surface 130 increases, jaw members 126 are permitted to open according to their natural spring bias.

The movement of sleeve 128 may be performed by means of an hydraulically or pneumatically controlled piston 132.

As shown in FIG. 10 piston 132 normally is disposed at the lower portion of a cylinder 134. The air pressure is provided through passage 136 to the lower portion of cylinder 134 on one side of piston 132. The pressure differential causes piston 132 to move upwardly and to contact a flange 138 formed as the upper part of sleeve 128. As flange 138 is driven upwardly by piston 132 a bellows spring 140 is contacted and compressed as shown in FIG. 11. In FIG. 11 piston 132 has moved to its upper extremity within cylinder 134 and bellows spring 140 has been completely compressed thereby permitting jaw members 126 to be set in an open configuration and release tool 66. As the pressure within cylinder 134 is released through passage 136, piston 132 will move downwardly due to the restoring force provided by bellows spring 140 through flange 138. Sleeve 128 will thus move downwardly with respect to collet 124 and jaw members 126 will be set in a closed configuration as the point of contact between jaw members 126 and surface 130 moves upwardly along surface 130. Thus, in the normal, non powered state, means 92 is configured to engage tool 66. It is entirely possible that many other alterations and modifications might be made to means 92 within the spirit and scope of the present invention. For example, sleeve 128 could be fixed and collet 124 made the movable portion. The camber of surface 130 might be oppositely oriented such that the jaw members 126 are normally in the open configuration and only in the closed configuration during a pressurized or powered state.

The operation of the present invention may be briefly understood as follows.

A control means well known to the art of numerical control machinery may be used to drive the eight spindles 42 of the apparatus through a preprogrammed pattern. Such a program would include variable spindle RPMs, feed rates, feed excursions, and the automatic selection of various tools. In addition, gantry 40 and worktable 38 may be appropriately translated in the X and Y direction to drill a predetermined pattern of holes. According to the present invention, burring of the upper surface of the workpiece may be avoided by providing an overlay plate, such as a layer of aluminum or easily machinable material which may be temporarily tacked or placed on a stack of printed circuit boards. Thus, as spindle 42 is lowered during a drilling operation, pressure foot 120 will contact the overlay plate and provide additional pressure to the inner face between the overlay plate and the first printed circuit board of the stack to be machined. The pattern is then drilled through the overlay plate at high speeds and with high degree of precision. After completion, the overlay plate is discarded leaving a fabricated printed circuit board without any top surface burring. Tool 66 may be provided with a collar 142 best shown in FIGS. 10 and 11. Collar 142 is press fit onto tool 66 according to the length of the tool and the desired depth of hole to be drilled. Thus, tools 66 of arbitrary configurations may be reduced to a uniform configuration with respect to tool holder 78 and engagement with means 92.

It must be expressly understood throughout that many alterations and modifications may be made to any of the features of the present invention without departing from their scope and spirit. For example, although a lead screw 104 has been shown in FIG. 9 as providing a stable high feed rate for spindle 42 it is contemplated that other types of means for feeding spindle 42 can be employed. For example, engaging nut 102 might be stationarily fixed with respect to spindle motor 106 and lead screw 104 directly driven by driven access 98. Similarly a worn screw and lead screw combination or rack and pinion might be employed provided that the combination used is capable of providing direct and uniform feed rates according to the present invention. The embodiment which has been illustrated in the above figures has been chosen only for the sake of clarity and illustration and is not intended to limit the scope of the present invention.

I claim:

1. An apparatus for use in high speed, precision drilling and machining comprising:
   a movable worktable for holding and positioning a plurality of workpieces;
   a movable spindle gantry disposed in a spaced apart relationship with respect to said worktable;
   a plurality of spindles rotatably supported on said spindle gantry, each of said spindles holding a drilling tool and being disposed on said spindle gantry in a functionally operable relationship with respect to each of said workpieces each tool having a primary relief angle; and
   means coupled to each of said spindles for feeding said spindles perpendicularly with respect to a corresponding one of said workpieces, said means including a member having a plurality of engaging surfaces to permit said member to execute bidirectional motion perpendicular to said workpieces at a feedrate wherein the angle of descent of each tool is less than the primary relief angle of the tool by a preselected increment;
   whereby said spindles may be directly driven at high rates of feed with a high degree of precision and stability.

2. The apparatus of claim 1 wherein said member is a lead screw and said means includes a driving nut engaging said lead screw.

3. The apparatus of claim 2 wherein said lead screw is stationarily disposed with respect to a corresponding one of said spindles and said driving nut is driven by motor means for selectively imparting a bidirectional rotational motion to said driving nut.

4. The apparatus of claim 1 wherein each said workpiece is provided with an overlay plate disposed between each of said spindles and its corresponding workpiece.

5. The apparatus of claim 1 wherein each of said spindles includes means for automatically engaging and disengaging a tool comprising;
 a collet having a plurality of jaw members, selectively assuming an open and closed configuration, said jaw members biased to assume an open configuration, and said jaw members for engaging said tool;
 a sleeve disposed about said collet for selectively urging said jaw members into said closed configuration; and
 means for moving said sleeve with respect to said collet to selectively open and close said jaw members.

6. The apparatus of claim 5 wherein said jaw members are resiliently biased outward to a spaced apart, open configuration and wherein said sleeve urges said jaw members to said closed configuration by forcing said jaw members together.

7. The apparatus of claim 6 wherein said jaw members and sleeve are in slideable contact along a circular surface of varying diameter.

8. The apparatus of claim 7 wherein said circular surface lies on an internal truncated conical surface provided on said sleeve.

9. The apparatus of claim 5 wherein said means for moving said sleeve member includes a fluidically driven piston and cylinder to open said jaw members and spring means for normally closing said jaw members.

10. The apparatus of claim 1 wherein said movable worktable is translated along a given axis by a lead screw, engaging nut and motor means for imparting a bidirectional force to said lead screw wherein said given axis is disposed in the proximity of the axis of symmetry of said worktable so that torques applied to said worktable are substantially minimized.

11. The apparatus of claim 1 wherein said plurality of spindles are disposed in at least two rows, each said row being selectively spaced by means for adjusting the distance between each said row.

12. The apparatus of claim 5 wherein a plurality of tools are disposed on a tool changer coupled to said worktable.

13. The apparatus of claim 12 wherein said tool changer includes means for selectively disposing said plurality of tools in a first position for access by at least one of said spindles and for selectively disposing said plurality of tools in a second position to permit unobstructed movement of at least one of said spindles.

14. A method for high speed precision drilling including the step of feeding a drill into a workpiece at a rate wherein the angle of descent is less than the primary relief angle of said drill by a preselected increment and wherein the chisel point area of said drill extends approximately to or less than one third the radius of said drill,
 whereby a large number of workpieces may be drilled with a large number of holes in a small interval of time with a high degree of precision and without the need for a high degree of operator skill.

15. The method of claim 14 wherein said angle descent is approximately 2° to 5° less than said primary relief angle.

16. The method of claim 14 wherein the feed rate of said drill is approximately equal to $\frac{1}{3} D \pi \tan \alpha$ where D is the diameter of said drill and $\alpha$ is the angle of descent.

17. The method of claim 16 wherein said angle of descent is approximately ten degrees.

18. The method of claim 14 wherein said preselected increment is the minimum amount of difference between said primary angle and angle of descent in order to avoid heel dragging.

19. A method for high speed precisions drilling including the step of feeding a drill into a workpiece by means of a spindle being fed toward said workpiece by a lead screw and engaging nut coupled to said spindle, said lead screw being advanced and retracted through said engaging nut at a rate such that the angle of descent of said drill is less than the primary relief angle angle of said drill by a predetermined increment,
 whereby a large number of workpieces may be drilled with a large number of holes in a small interval of time with a high degree of precisions and without the need for a high degree of operator skill.

20. The method of claim 19 wherein said drill has a chisel point area approximately equal to or less than one ninth of the cross sectional area of said drill.

21. The method of claim 20 wherein increment is approximately in the range of 2° to 5°.

22. The method of claim 20 further including the step of automatically changing drills in said spindle, said spindle including means for automatically engaging and disengaging said drill comprising a collet, sleeve and actuator means, said collet having a plurality of resilient jaw members biased in an open and spaced apart configuration to release said drill, said sleeve having an internal truncated conical surface in sliding contact with said jaw members, said sleeve movable with respect to said jaw members into a closed configuration to grasp said drill, said actuator means for moving said sleeve member with respect to said jaw members, said drill being held by a tool changer, said tool changer disposing said drills in a first position to permit engagement of one of said tools by said collet and a second position to permit unobstructed movement of said spindle.

23. The method of claim 20 further comprising the steps of translating said workpiece along a given axis by a worktable driven by a lead screw, engaging nut and motor means for imparting a bidirectional force to said lead screw wherein said lead screw is disposed in the proximity of the axis of symmetry of said worktable so that rorques applied torques applied to said worktable are minimized.

* * * * *